United States Patent
Bowen

(10) Patent No.: US 7,377,871 B2
(45) Date of Patent: May 27, 2008

(54) TRANSFER CASE WITH TORQUE LIMITING CLUTCH ASSEMBLY

(75) Inventor: Thomas C. Bowen, Rochester Hills, MI (US)

(73) Assignee: Magna Powertrain USA, Inc., Troy, MI (US)

( * ) Notice: Subject to any disclaimer, the term of this patent is extended or adjusted under 35 U.S.C. 154(b) by 0 days.

(21) Appl. No.: 11/674,698

(22) Filed: Feb. 14, 2007

(65) Prior Publication Data

US 2007/0225105 A1 Sep. 27, 2007

Related U.S. Application Data

(60) Provisional application No. 60/786,263, filed on Mar. 27, 2006.

(51) Int. Cl.
F16H 35/10 (2006.01)
F16D 7/02 (2006.01)

(52) U.S. Cl. .......................... 475/263; 464/43
(58) Field of Classification Search .............. 475/263; 464/43
See application file for complete search history.

(56) References Cited

U.S. PATENT DOCUMENTS

| | | | |
|---|---|---|---|
| 1,942,512 A * | 1/1934 | Lee | 464/43 |
| 2,657,557 A * | 11/1953 | Young | 464/10 |
| 2,763,141 A * | 9/1956 | Dodge | 464/31 |
| 2,977,779 A | 4/1961 | Steinke et al. | |
| 3,648,483 A * | 3/1972 | Garcia, Jr. | 464/43 |
| 3,901,092 A | 8/1975 | Romick | |
| 4,132,297 A | 1/1979 | Brown et al. | |
| 4,762,021 A | 8/1988 | Teraoka | |
| 5,551,917 A | 9/1996 | Wood | |
| 6,079,535 A | 6/2000 | Mueller et al. | |
| 6,155,395 A | 12/2000 | Braford, Jr. | |
| 6,568,519 B2 | 5/2003 | Lovatt | |
| 6,594,881 B2 * | 7/2003 | Tibbitts | 29/450 |
| 6,607,182 B1 * | 8/2003 | Turco et al. | 254/266 |
| 6,623,395 B2 * | 9/2003 | Lovatt | 475/204 |
| 6,662,684 B1 * | 12/2003 | Krisher | 74/606 R |
| 7,025,680 B2 | 4/2006 | Tabuchi et al. | |
| 7,040,470 B2 | 5/2006 | Dion | |
| 7,090,060 B1 | 8/2006 | Whitney | |
| 7,128,193 B2 | 10/2006 | Murakami | |

* cited by examiner

*Primary Examiner*—Ha D. Ho
(74) *Attorney, Agent, or Firm*—Harness, Dickey & Pierce, P.L.C.

(57) ABSTRACT

A power transfer unit is provided with a torque limiting coupling that limits the amount of torque that can be transferred to the driveline components when torque peaks occur while torque is transferred to the non-slipping wheels. The torque limiting coupling includes an engagement member disposed between an input from a driving member and an output to a driven member. The engagement member is located radially between and provides a frictional engagement between the input and the output. The engagement member is capable of slipping under heavy torque loads in order to protect the driveline components.

16 Claims, 4 Drawing Sheets

TRANSFER CASE WITH TORQUE LIMITING CLUTCH ASSEMBLY

CROSS-REFERENCE TO RELATED APPLICATIONS

This application claims the benefit of U.S. Provisional Application No. 60/786,263, filed on Mar. 27, 2006. The disclosure(s) of the above application(s) is (are) incorporated herein by reference.

FIELD

The present disclosure relates to power transfer units for use in motor vehicles and, more particularly, to an improved torque limiting clutch assembly for use in such power transfer units.

BACKGROUND

The statements in this section merely provide background information related to the present disclosure and may not constitute prior art.

In view of increased consumer popularity in four-wheel drive vehicles, a plethora of power transfer systems are currently being utilized in vehicular driveline applications for selectively directing power (i.e., drive torque) from the powertrain to all four wheels of the vehicle. In many power transfer systems, a power transfer unit, such as a transfer case, is incorporated into the driveline and is operable for delivering drive torque from the powertrain to both the front and rear wheels. Many conventional transfer cases are equipped with a mode shift mechanism that can be selectively actuated to shift between a two-wheel drive mode and a four-wheel drive mode.

It is also known to use "on-demand" power transfer systems for automatically biasing power between the front and rear wheels, without any input or action on the part of the vehicle operator, when traction is lost at either the front or rear wheels. Modernly, it is known to incorporate the "on-demand" feature into a transfer case by replacing the mechanically-actuated mode shift mechanism with a clutch assembly that is interactively associated with an electronic control system and a sensor arrangement. During normal road conditions, the clutch assembly is typically maintained in a non-actuated condition such that drive torque is only delivered to the rear wheels. However, when the sensors detect a low traction condition, the clutch assembly is automatically actuated to deliver torque "on-demand" to the front wheels. Moreover, the amount of drive torque transferred through the clutch assembly to the non-slipping wheels can be varied as a function of specific vehicle dynamics, as detected by the sensor arrangement. This on-demand clutch control system can also be used in full-time transfer cases to automatically bias the torque ratio across an interaxle differential.

Notwithstanding significant sales of four-wheel drive and all-wheel drive vehicles, much emphasis is directed to improving vehicle performance and fuel efficiency while at the same time reducing weight. In conflict with this emphasis is the need to engineer the components of power transfer units to meet all torque requirements anticipated for the vehicle application. Specifically, the components must be sized to survive during torque peak conditions despite the fact that such peak conditions rarely occur during typical use of the motor vehicle. Thus, a need exists to limit the maximum torque transferred by a power transfer unit so as to permit the components to be smaller in size and weight.

SUMMARY

A power transfer unit for use in motor vehicles is provided with a torque limiting coupling that limits the drive torque transferred to the driveline when torque peaks occur. The power transfer unit includes an input member driven by the powertrain, an output member driving the driveline, and a torque limiting coupling disposed between the input member and the output member. The torque limiting coupling establishes a spring-biased drive connection between the input member and the output member.

Thus, it is an object of the present invention to provide a shaft and sprocket assembly having a torque limiting coupling.

It is a further object of the present invention to provide a shaft and sprocket assembly equipped with a torque limiting coupling and which is well-suited for use in a transfer case or other vehicular drivetrain devices.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
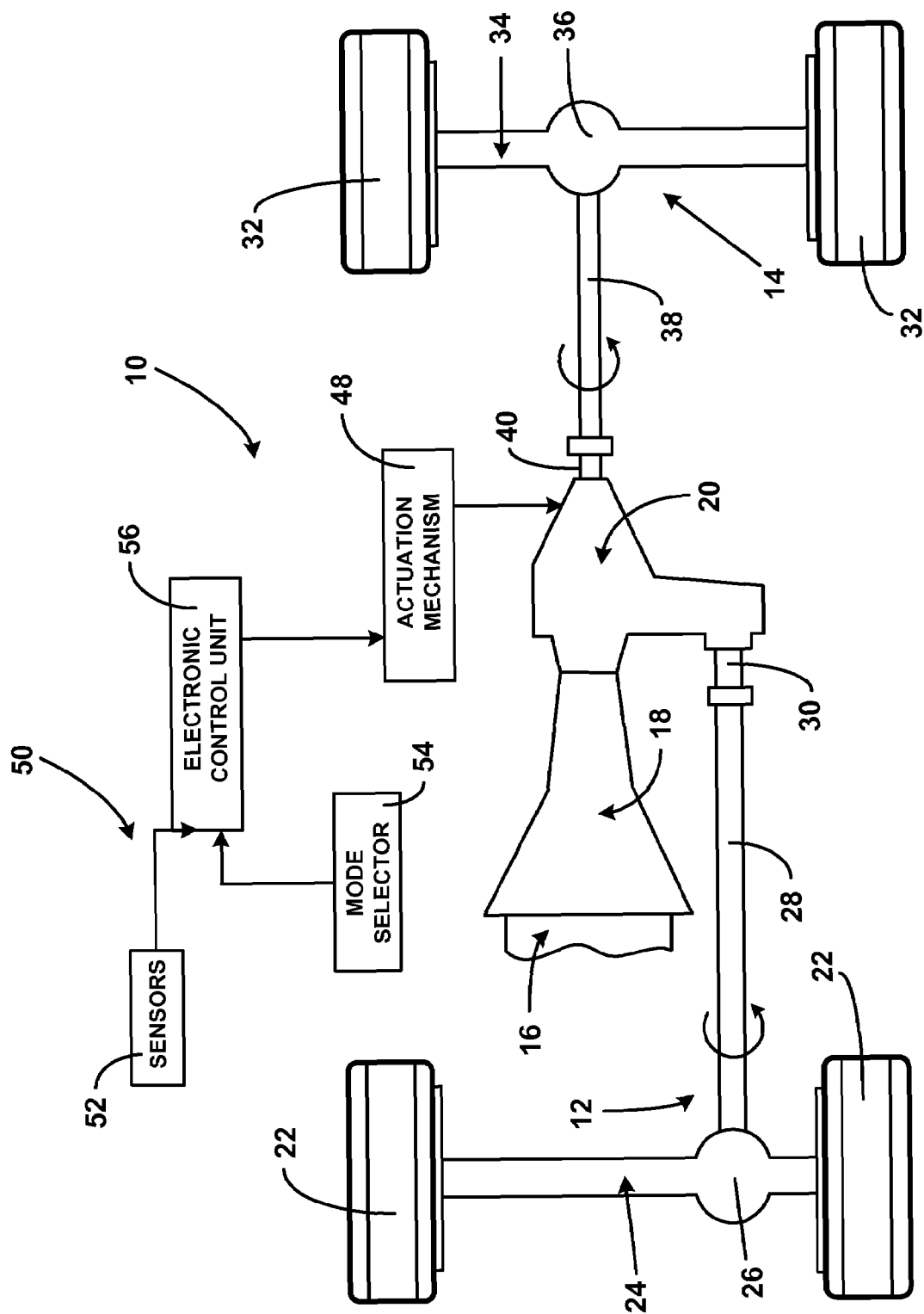
FIG. 1 is a schematic view of a four-wheel drive vehicle equipped with a power transfer unit having an actively-controlled torque transfer clutch and a control system according to the present disclosure.

The following description is merely exemplary in nature and is not intended to limit the present disclosure, application, or uses.

Referring now to the drawings, a four-wheel drive vehicle 10 is schematically shown to include a front driveline 12 and a rear driveline 14 both drivable from a powertrain. The powertrain is shown to include an engine 16 and a transmission 18 which may be of either the manual or automatic type. In the particular embodiment shown, vehicle 10 further includes a power transfer unit, hereinafter referred to as transfer case 20, that is operable for transmitting drive torque from engine 16 and transmission 18 to front driveline 12 and rear driveline 14. Front driveline 12 includes a pair of front wheels 22 connected at opposite ends of a front axle assembly 24 having a front differential 26 that is coupled to one end of a front drive shaft 28, the opposite end of which is coupled to a front output shaft 30 of transfer case 20. Similarly, rear driveline 14 includes a pair of rear wheels 32 connected at opposite ends of a rear axle assembly 34 having a rear differential 36 coupled to one end of a rear drive shaft 38, the opposite end of which is interconnected to a rear output shaft 40 of transfer case 20.

As will be further detailed, transfer case 20 is equipped with a two-speed range unit 42, an interaxle differential 44, a clutch assembly 46 and a power-operated actuation mechanism 48 that is operable to control coordinated shifting of range unit 42 and adaptive engagement of clutch assembly 46. In addition, a control system 50 is provided for controlling power-operated actuation mechanism 48. Control system 50 includes sensors 52 for detecting operational characteristics of motor vehicle 10, a mode selector 54 for permitting the vehicle operator to select one of the available drive modes, and an electronic control unit 56 operable to generate control signals in response to input signals from sensors 52 and mode signals from mode selector 54. The control signals are sent to an electric motor assembly 58 (FIG. 2) associated with actuation mechanism 48.

Figure 2:
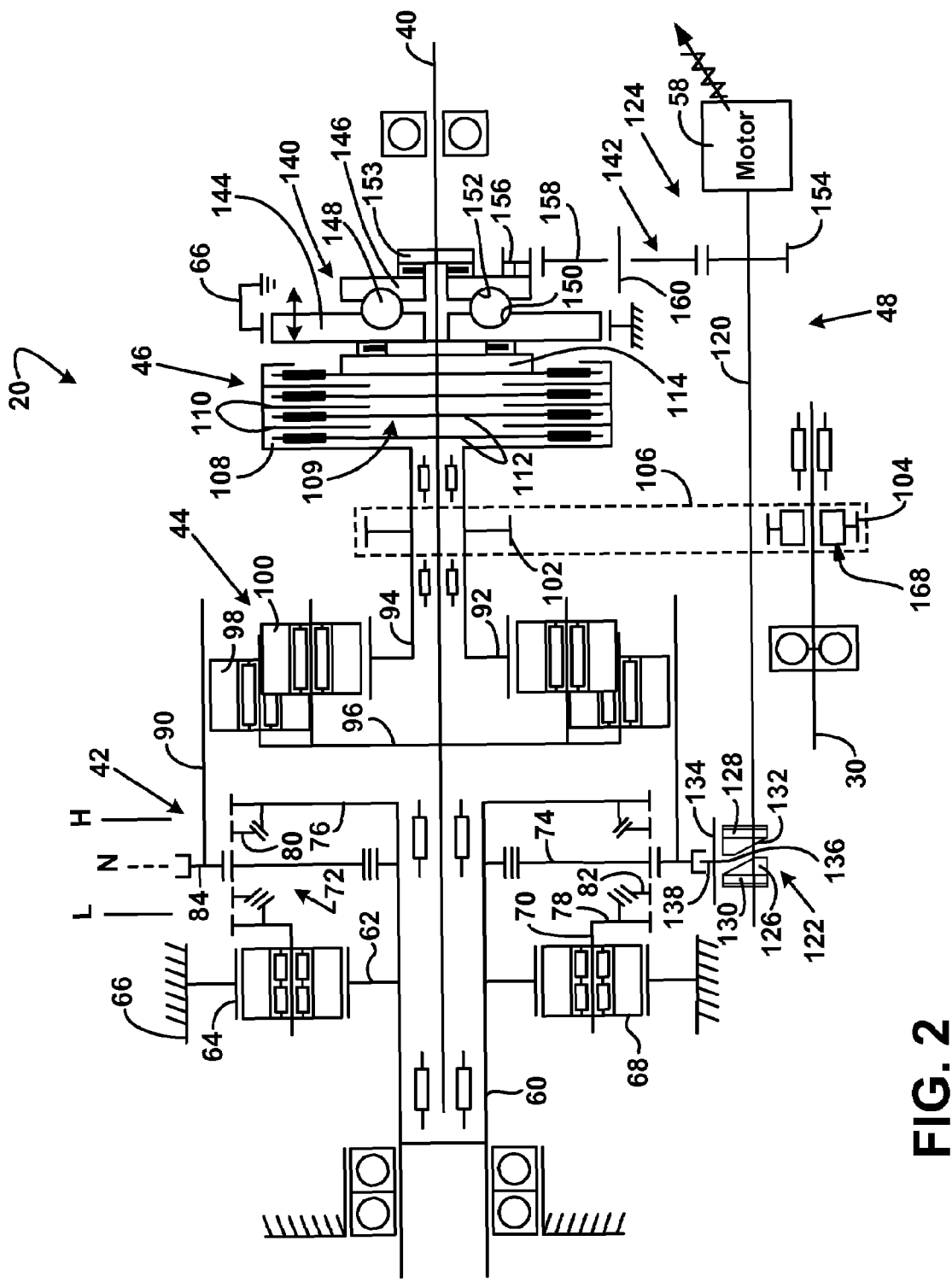
FIG. 2 is a schematic diagram of the power transfer unit of FIG. 1 defining a full-time two-speed transfer case having a chain drive assembly equipped with a torque limiting coupling according to the present invention.

With particular reference to FIG. 2, transfer case 20 is schematically shown to include an input shaft 60 adapted to be driven by the output of transmission 18. Range unit 42 includes a planetary gearset having a sun gear 62 driven by input shaft 60, a ring gear 64 fixed to a stationary housing 66 and planet gears 68 rotatably supported by a planet carrier 70 and which are meshed with both sun gear 62 and ring gear 64. Range unit 42 further includes a synchronized dog clutch assembly 72 having a clutch hub 74 journalled on input shaft 60, a first clutch plate 76 fixed for rotation with input shaft 60 and a second clutch plate 78 fixed for rotation with planet carrier 70. Synchronized dog clutch assembly 72 further includes a first synchronizer 80 disposed between clutch hub 74 and first clutch plate 76, a second synchronizer 82 disposed between clutch hub 74 and second clutch plate 78 and a shift collar 84 splined for rotation with and bi-directional axial sliding movement on clutch hub 74.

Shift collar 84 is shown in its neutral (N) position where it is disengaged from both first clutch plate 76 and second clutch plate 78. Shift collar 84 is moveable from its N position to a high-range (H) position whereat shift collar 84 is coupled to first clutch plate 76 and is driven at a direct speed ratio relative to input shaft 60. In contrast, shift collar 84 can be moved from its N position to a low-range (L) position whereat shift collar 84 is coupled to second clutch plate 78 and is driven by planet carrier 70 at a reduced speed ratio relative to input shaft 60. First synchronizer 80 functions to establish speed synchronization between shift collar 84 and input shaft 60 during movement of shift collar 84 toward its H position. Likewise, second synchronizer 82 functions to establish speed synchronization between shift collar 84 and planet carrier 70 during movement of shift collar 84 toward its L position.

Interaxle differential 44 includes an input member driven by shift collar 84, a first output member driving rear output shaft 40, and a second output member operably arranged to drive front output shaft 30. In particular, differential 44 includes an annulus gear 90 fixed for rotation with shift collar 84, a sun gear 92 fixed to a quill shaft 94 rotatably supported on rear output shaft 40, and a pinion carrier 96 fixed to rear output shaft 40 which rotatably supports meshed pairs of first pinion gears 98 and second pinion gears 100. In addition, first pinion gears 98 are meshed with annulus gear 90 and second pinion gears 100 are meshed with sun gear 92. As such, driven rotation of annulus gear 90 (at either of the direct or reduced speed ratios) causes drive torque to be transmitted to rear output shaft 40 via pinion carrier 96 and to quill shaft 94 via sun gear 92. Drive torque is transferred from quill shaft 94 to front output shaft 30 via a chain drive assembly which includes a drive sprocket 102 fixed to quill shaft 94, a driven sprocket 104 supported on front output shaft 30, and a drive chain 106 meshed with sprockets 102 and 104. As will be detailed, the chain drive assembly incorporates a torque limiting coupling 168 between driven sprocket 104 and front output shaft 30. Based on the particular configuration of interaxle differential 44, a specific torque distribution ratio is established (i.e., 50/50, 64/36) between rear output shaft 40 and front output shaft 30. However, the magnitude of the torque transfer from driven sprocket 104 to front output shaft 30 can be limited by a torque limiting device 168 as discussed below.

With continued reference to FIG. 2, clutch assembly 46 is shown to be a multi-plate friction clutch comprised of a clutch drum 108 fixed to quill shaft 94, a clutch pack 109 having outer clutch rings 110 splined for rotation with clutch drum 108 which are interleaved with inner clutch rings 112 splined to rear output shaft 40, and an apply plate 114 for applying an axially-directed clutch engagement force on clutch pack 109.

Power-operated actuation mechanism 48 is operable to cause movement of shift collar 84 between its three distinct positions as well as to generate the clutch engagement force exerted on clutch pack 109 of clutch assembly 46. In its most basic sense, actuation mechanism 48 includes motor assembly 58, a driveshaft 120 rotatively driven by the output of motor assembly 58, a range actuator assembly 122, and a clutch actuator assembly 124. Motor assembly 58 is preferably an electric gearmotor equipped with an encoder capable of accurately sensing the rotated position of driveshaft 120. Range actuator assembly 122 includes a range cam 126 fixed for rotation with driveshaft 120. Cam 126 is cylindrical and includes a high-range circumferential groove 128, a low-range circumferential groove 130 and a spiral intermediate groove 132 connecting circumferential grooves 128 and 130. Range actuator assembly 122 further includes a range fork 134 having a follower segment 136 shown retained in spiral groove 132 and a fork segment 138 retained in an annular groove formed on shift collar 84.

As will be appreciated, rotation of range cam 126 results in axial movement of shift collar 84 due to retention of follower segment 136 in spiral groove 132. Specifically, rotation of driveshaft 120 in a first direction causes concurrent rotation of range cam 126 which, in turn, causes follower segment 136 to move within spiral groove 132 until shift collar 84 is located in its H position. At this position, follower segment 136 enters high-range dwell groove 128 which permits continued rotation of drive shaft 120 in the first direction while shift collar 84 is retained in its H position with the high-range drive connection established between input shaft 60 and annulus gear 90. Thereafter, rotation of driveshaft 120 and range cam 126 in the opposite second direction causes follower segment 136 to exit high-range dwell groove 128 and re-enter intermediate spiral groove 132 for causing shift collar 84 to begin moving from the H position toward its L position. Upon continued rotation of range cam 126 in the second direction, follower segment 136 exits spiral groove 132 and enters low-range dwell groove 130 for locating shift collar 84 in its L position and establishing the low-range drive connection between planet carrier 70 and annulus gear 90.

Clutch actuator assembly 124 is also driven by motor assembly 58 and includes a ball-ramp unit 140 and a gear assembly 142. Ball-ramp unit 140 includes a first ball-ramp plate 144, a second ball-ramp plate 146, and a plurality of balls 148 disposed in ramped grooves 150 and 152 formed in corresponding face surfaces of plates 144 and 146. First ball-ramp plate 144 is non-rotatably secured to housing 66 and is supported for bi-directional axial movement. Specifically, first ball-ramp plate 144 is shown to coaxially surround rear output shaft 40 and is arranged to move axially for exerting an axially-directed clutch engagement force on apply plate 114 for frictionally engaging clutch pack 109. A thrust bearing is shown located between apply plate 114 and first ball-ramp plate 144 for permitting relative rotation therebetween. Second ball-ramp plate 146 also coaxially surrounds rear output shaft 40 and is supported for limited rotation relative to first ball-ramp plate 144. Second ball-ramp plate 146 is axially restrained relative to rear output shaft 40 via a backing plate 153. A thrust bearing is shown located between backing plate 153 and second ball-ramp plate 146. As such, relative rotation between ball-ramp plates 144 and 146 causes balls 148 to travel along ramped grooves 150 and 152 which, in turn, acts to control the axial position of second ball-ramp plate 146 relative to clutch pack 109, thereby controlling the magnitude of the clutch engagement force exerted thereon.

Gear assembly 142 includes a first gear 154 fixed for rotation with driveshaft 120, a second gear 156 fixed to second ball-ramp plate 146, and a third gear 158 rotatably supported on an idlershaft 160 and which is meshed with both first gear 154 and second gear 156. Preferably, second gear 156 is an arcuate gear segment formed integrally with, or rigidly secured to, an outer face surface of second ball-ramp plate 146. The profile of ramped grooves 150 and 152 and the gear ratio established by gear assembly 142 between drive shaft 120 and second ball-ramp plate 146 are designed to permit bi-directional rotation of drive shaft 120 through a range of travel sufficient to permit shift collar 84 to move between its H and L positions without any significant clutch engagement force being transmitted by ball-ramp unit 140 to clutch assembly 46. However, additional bi-directional rotation of drive shaft 120, as accommodate by dwell grooves 128 and 130 in range cam 126, is designed to cause axial movement of second ball-ramp plate 146 between an "adapt-ready" position and a "locked" position. In the adapt-ready position, a minimum clutch engagement force is exerted on clutch pack 109 such that clutch assembly 46 is considered to be non-actuated. Preferably, this clutch engagement force applies a preload on clutch pack 109 to eliminate driveline clunk and permit instantaneous clutch actuation. Conversely, in the locked position, a maximum clutch engagement force is exerted on clutch pack 109 and clutch assembly 46 is considered to be fully engaged. Thus, by varying the axial position of second ball-ramp plate 146 between its adapt-ready and locked position, the torque bias across differential 44 can be continuously modulated to provide automatic clutch control of clutch assembly 46 in a range between its released and fully engaged conditions.

Control system 50 is provided to control the rotated position of drive shaft 120 in response to the mode signal delivered to ECU 56 by mode selector 54 and the sensor input signals sent by sensors 52. While sensors 52 can provide numerous indicators (i.e., shaft speeds, vehicle speed, acceleration/throttle position, brake status, etc.), it is contemplated that clutch assembly 46 is controlled, at a minimum, in response the magnitude of interaxle slip (ΔRPM) between output shafts 40 and 30. Mode selector 54 permits selection of one an Automatic Full-Time four-wheel high-range (Auto-4WH) drive mode, a Neutral mode, and a Locked four-wheel low-range (Lock-4WL) drive mode. In the Auto-4WH mode, shift collar 84 is located in its H position and the torque biasing generated by clutch assembly 46 is continuously modulated based on value of the sensor signals. In the Lock-4WL mode, shift collar 84 is in its L position and clutch assembly 46 is fully engaged. In the Neutral mode, shift collar 84 is in its N position and clutch assembly 46 is released. Obviously, other available drive modes can be provided if desired. For example, a Locked four-wheel high-range (LOCK-4WH) drive mode can be established by locating shift collar 84 in its H position and fully engaging clutch assembly 46.

While actuation mechanism 48 has been disclosed in association with a full-time transfer case, it will be understood that differential 44 could be eliminated such that clutch assembly 46 would function to modulate the drive torque transferred from rear output shaft 40 to front output shaft 30 for establishing an on-demand four-wheel drive mode. It is also understood that the transfer case could be single-speed power transfer unit with elimination of two-speed range unit 42.

Figure 3:
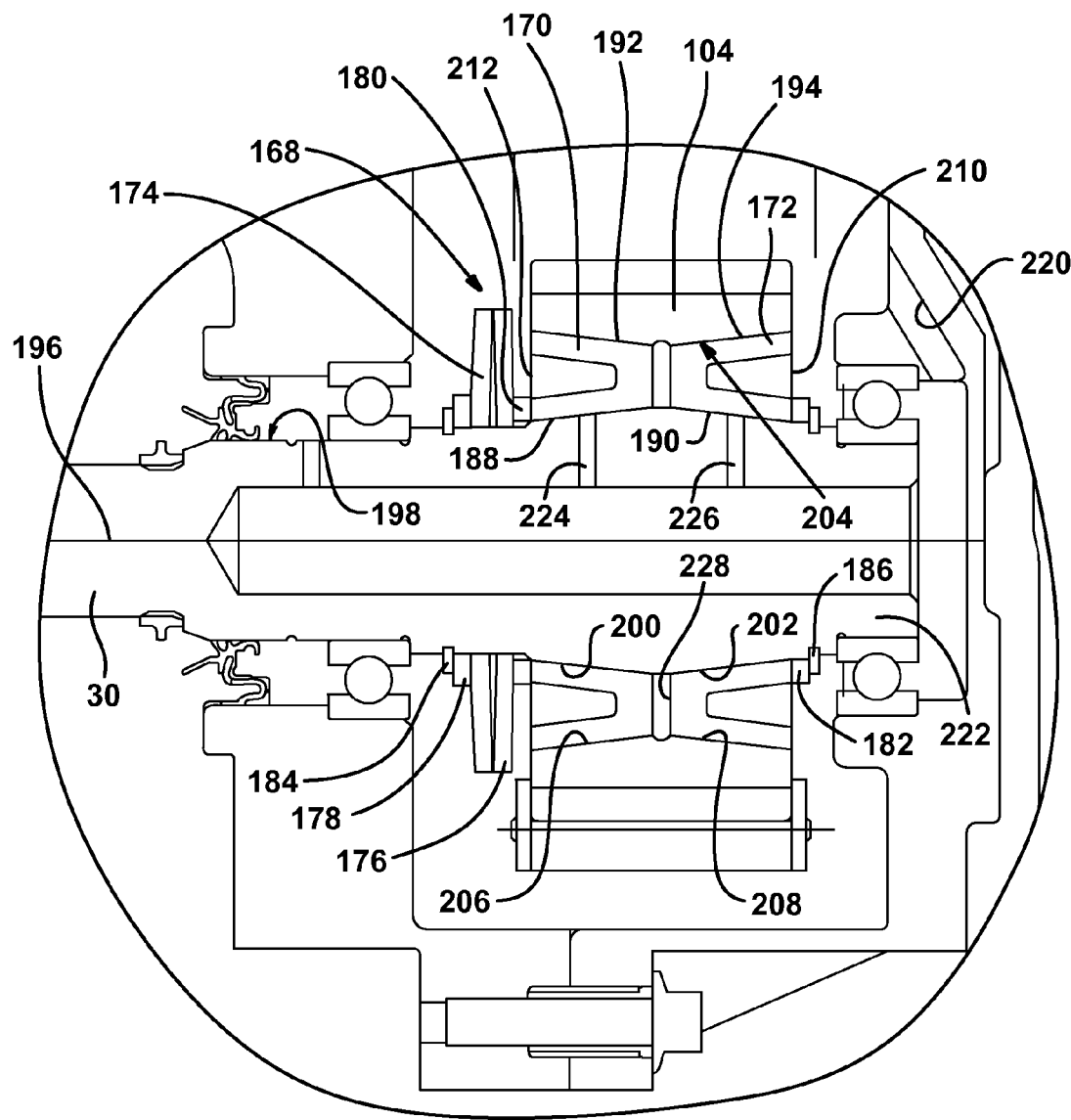
FIG. 3 is a sectional view of a torque limiting coupling embodying the device schematically shown in FIG. 2.

With additional reference to FIG. 3, the chain drive system is shown to include torque limiting coupling 168 disposed between front output shaft 30 and driven sprocket 104. As such, the combination of sprocket 104, shaft 30 and torque limiting coupling 168 define a torque-limited shaft and sprocket assembly. Torque limiting coupling 168 is shown to include a pair of cone clutches 170 and 172, a pair of belleville springs 174 and 176, a plurality of thrust washers 178, 180 and 182, and a pair of C-rings 184 and 186. Preferably, cone clutches 170 and 172 are annular ring-shaped components that are completely contained within the width of driven sprocket 104 during normal operation. Cone clutches 170 and 172 have corresponding inner surfaces 188 and 190 and outer surfaces 192 and 194 that are tapered relative to an axis of rotation 196 of front output shaft 30. Cone clutches 170 and 172 are oriented such that inner surfaces 188 and 190 and outer surfaces 192 and 194 extend generally opposite one another at a taper or ramp angle of approximately seven degrees relative to axis of rotation 196, although other suitable angles can be utilized.

Tapered inner surfaces 188 and 190 are adapted to frictionally engage similarly tapered portions of an outer surface 198 on front output shaft 30. Specifically, outer shaft surface 198 includes first and second conically-tapered portions 200 and 202 which extend generally parallel to inner cone surfaces 188 and 190, respectively. First and second tapered portions 200 and 202 extend generally opposite one another and are disposed at an angle of approximately seven degrees relative to axis of rotation 196, although other suitable angles can be utilized. While tapered portions 200 and 202 have been shown formed integrally as part of front output shaft 30, it is contemplated that conically-tapered hubs could be secured to shaft 30.

Outer surfaces 192 and 194 of cone clutches 170 and 172 are adapted to frictionally engage a similarly tapered inner surface 204 of driven sprocket 104. Specifically, inner sprocket surface 204 includes first and second conically-tapered portions 206 and 208 which extend generally parallel to outer surfaces 192 and 194, respectively. First and second tapered portions 206 and 208 extend generally opposite one another and are disposed at an angle of approximately seven degrees relative to axis of rotation 196, although other suitable angles can be utilized.

A first end wall 210 of cone clutch 172 abuts thrust washer 182, which, in turn, abuts C-ring 186. C-ring 186 is axially fixed to front output shaft 30, thereby preventing axial travel of cone clutch 172 in a first direction toward thrust washer 182. Cone clutch 172 is generally prevented from axial travel in a second direction generally opposite the first direction through its frictional engagement with front output shaft 30 and driven sprocket 104.

A first end wall 212 of cone clutch 170 abuts thrust washer 180. Thrust washer 180 is biased against first end wall 212 by belleville springs 174 and 176. Belleville springs 174 and 176 engage thrust washer 178 which abuts C-ring 184. C-ring 184 is axially fixed to front output shaft 30, thereby limiting axial travel of cone clutch 170 in the second axial direction mentioned above. Axial travel of cone clutch 170 in the first axial direction mentioned above is limited by its frictional engagement with front output shaft 30 and driven sprocket 104. Belleville springs 174 and 176 apply a predetermined spring load to cone clutch 170 in the first axial direction. The spring load is determined based on the cone geometry and friction coefficient as well as the desired torque transfer limit. The belleville springs are merely representative of a suitable spring biasing mechanism that can be used to maintain a desired spring load on cone clutches 170 and 172.

In the present example, front output shaft 30 and driven sprocket 104 are each made of steel, resulting in similar coefficients of thermal expansion. Cone clutches 170 and 172 are preferably made from bronze. As noted above, cone clutches 170 and 172 are preferably contained within the width of driven sprocket 104. This arrangement avoids grooving of the bronze friction surfaces.

In operation, drive torque is transferred by the chain drive assembly from driven sprocket 104 to front output shaft 30 due to frictional engagement of cone clutches 170 and 172 with driven sprocket 104 and front output shaft 30. As torque transfer is increased above a predetermined limit, the frictional coupling of cone clutches 170 and 172 with driven sprocket 104 and front output shaft 30 due to the bias loading of springs 174 and 176 is overcome. Accordingly, as the peak torque exceeds the predetermined limit, cone clutches 170 and 172 permit slip between driven sprocket 104 and front output shaft 30, thereby limiting the maximum amount of drive torque transferred to front output shaft 30. As noted above, this predetermined torque level or capacity can be any desired amount and can be adjusted based upon the parameters noted above.

To provide adequate lubrication to the interface surfaces between the steel and bronze components, a lube hole 220 in housing 66 permits flow of lubricant to a central lubrication channel 222 formed in front output shaft 30. Ports 224 and 226 provide a flow path for lubricant from channel 222 to the interface between shaft surface 200 and cone surface 188 and the interface between shaft surface 202 and cone surface 190. Lubricant is also permitted to flow to the interface between outer cone surface 192 and sprocket inner cone surface 206 as well as the interface between outer cone surface 194 and sprocket inner cone surface 208 via a central radial passage 228. It is contemplated that cone surfaces 188 and 192 on first cone clutch 170 and cone surfaces 190 and 194 on second cone clutch 172 may be grooved and/or have lube slots formed therein to assist in routing the lubricant across the corresponding shaft and sprocket surfaces. Finally, a friction material may be bonded to the cone surfaces of cone clutches 170 and 172 and/or the mating conical surfaces on front output shaft 30 or driven sprocket 104.

Figure 4:
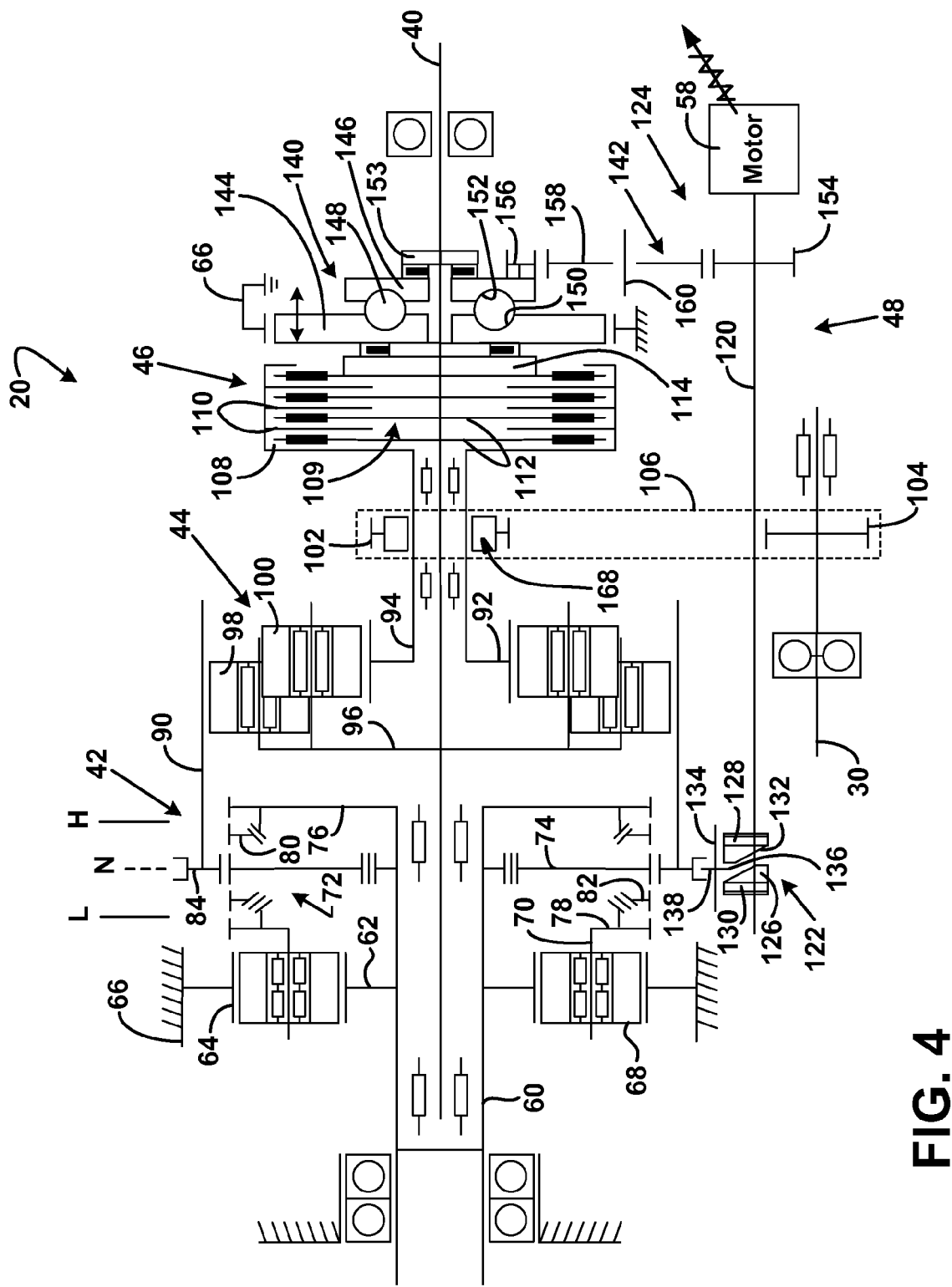
FIG. 4 is a schematic diagram of an alternative installation of the torque limiting chain drive assembly within the full-time transfer case of FIG. 2

Torque limiting coupling 168 has been described as being located between driven sprocket 104 and front output shaft 30. However, it is understood that torque limiting coupling 168 can be located at any other location where control of torque transfer is desired. To this end, FIG. 4 illustrates torque limiting coupling 168 operably disposed between quill shaft 94 and drive sprocket 102 with driven sprocket 104 now fixed for rotation with front output shaft 30. Other potential driveline locations for torque limiting coupling 168 may include the connection interface between one or both propshafts 28 and 38 and their inputs to corresponding differentials 26 and 36.

The above reference embodiments clearly set forth the novel and unobvious features, structure and/or function of the present disclosure. However, one skilled in the art will appreciate that equivalent elements and/or arrangements may be used which will be covered by the scope of the following claims.

What is claimed is:

1. A power transfer unit for a vehicle having a powertrain and a driveline, comprising:
    an input member driven by the powertrain;
    an output member driving the driveline; and
    a torque limiting coupling disposed between said input and output members, said torque limiting coupling including a first cone clutch having an outer conical surface engaging a first inner conical surface formed on said input member and an inner conical surface diverging from said outer conical surface and engaging a first outer conical surface formed on said output member, and a spring biasing mechanism applying a spring load on said first cone clutch for establishing frictional engagement between said conical surfaces of said first cone clutch and said conical surfaces on said input and output members.

2. The power transfer unit of claim 1 wherein said torque limiting coupling includes a second cone clutch having an outer conical surface engaging a second inner conical surface formed on said input member and an inner conical surface engaging a second outer conical surface formed on said output member.

3. The power transfer unit of claim 2 wherein said first cone clutch is disposed between said spring biasing mechanism and said second cone clutch.

4. The power transfer unit of claim 2 wherein said first and second inner conical surfaces on said output extend in opposite directions relative to a rotary axis of said output member.

5. The power transfer unit of claim 2 wherein said input member is a sprocket and said output member is a shaft.

6. A transfer case comprising:
    an input shaft;
    a first output shaft driven by said input shaft;
    a second output shaft; and
    a torque transfer mechanism having a driving member driven by said first output shaft, a driven member driving said second output shaft, and a torque limiting coupling therebetween, said torque limiting coupling including an engagement member having a first tapered surface engaging a tapered surface on said driving member and a second tapered surface engaging a tapered surface on said driven member, and a biasing mechanism for biasing said engagement member into frictional contact with said driven member and said driving member.

7. The transfer case of claim 6 further comprising a first sprocket fixed to said first output shaft, a second sprocket supported on said second output shaft, and a transfer device for causing said first sprocket to drive said second sprocket, and wherein said engagement member is disposed between said second sprocket and said second output shaft such that said driving member is fixed to said second sprocket and said driven member is fixed to said second output shaft.

8. The transfer case of claim 7 wherein said engagement member is a cone clutch having said first tapered surface in frictional engagement with said tapered surface formed on said second sprocket and said second tapered surface in frictional engagement with said tapered surface formed on said second output shaft.

9. The transfer case of claim 6 further comprising a first sprocket supported on said first output shaft, a second sprocket fixed to said second output shaft, and a transfer device for causing said first sprocket to drive said second sprocket, and wherein said engagement member is disposed between said first sprocket and said first output shaft such that said driving member is fixed to said first sprocket and said driven member is fixed to said first output shaft.

10. The transfer case of claim 9 wherein said engagement member is a cone clutch having said first tapered surface in frictional engagement with said tapered surface formed on said first sprocket and said second tapered surface in frictional engagement with said tapered surface formed on said first output shaft.

11. The transfer case of claim 6 wherein said engagement member includes a first cone clutch.

12. The transfer case of claim 11 wherein said engagement member includes a second cone clutch displaced axially from said first cone clutch.

13. A transfer case comprising
an input shaft;
a first output shaft in a driven engagement with said input shaft;
a first sprocket arranged around said first output shaft;
a second output shaft in a driven engagement with said first output shaft;
a second sprocket arranged around said second output shaft, said second sprocket in a driven engagement with said first sprocket; and
a torque transfer mechanism at least partially disposed between at least one of said first output shaft and said first sprocket and said second output shaft and said second sprocket, said torque transfer mechanism including first and second engagement members being axially moveable relative to one another, each engagement member including a conical inner surface engaging one of said first and second output shafts as well as a conical inner surface engaging one of said first and second output shafts as well as a conical outer surface engaging the corresponding one of said first and second sprockets, said conical surfaces of said first engagement member tapering in opposite directions from one another.

14. The transfer case of claim 13 wherein said conical surfaces of said second engagement member taper in opposite directions from one another.

15. The transfer case of claim 14 wherein said conical outer surfaces of said first and second engagement members taper toward one another.

16. The transfer case of claim 15 wherein said conical inner surfaces of said first and second engagement members taper away from one another.

* * * * *